(12) United States Patent
Parker

(10) Patent No.: US 6,392,323 B1
(45) Date of Patent: May 21, 2002

(54) PROTECTIVE COVERING FOR MOTOR LEADS

(75) Inventor: Rodney Parker, Wylie, TX (US)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/652,164

(22) Filed: Aug. 31, 2000

(51) Int. Cl.⁷ .............................................. H02K 5/22
(52) U.S. Cl. ...................... 310/89; 310/71; 174/138 F; 439/892
(58) Field of Search .................... 310/71, 89, 85; 439/892, 893; 174/138 F

(56) References Cited

U.S. PATENT DOCUMENTS

| | | | | |
|---|---|---|---|---|
| 2,487,328 A | * | 11/1949 | George et al. ................ | 310/71 |
| 2,590,559 A | * | 3/1952 | Miller .......................... | 310/71 |
| 3,016,511 A | * | 1/1962 | Unger .......................... | 310/71 |
| 3,803,530 A | * | 4/1974 | Lapraik .................. | 174/138 F |
| 4,698,459 A | * | 10/1987 | Drake .................... | 174/138 F |
| 4,712,029 A | * | 12/1987 | Nold ............................. | 310/71 |
| 4,782,244 A | * | 11/1988 | Wakimoto .................. | 307/116 |
| 4,840,547 A | * | 6/1989 | Fry ............................. | 417/422 |
| 4,921,443 A | * | 5/1990 | Sato ......................... | 174/138 F |
| 5,025,184 A | * | 6/1991 | Sekine et al. .................. | 310/71 |
| 5,126,608 A | * | 6/1992 | Sogabe et al. ................. | 310/71 |
| 5,199,898 A | * | 4/1993 | Wisner ........................ | 439/367 |
| 5,338,898 A | * | 8/1994 | Luciano et al. ........... | 174/138 F |
| 5,442,138 A | * | 8/1995 | Ochi ....................... | 174/138 F |
| 5,519,273 A | * | 5/1996 | Keck ............................ | 310/71 |
| 5,925,851 A | * | 7/1999 | Sugahara .................. | 174/65 G |
| 6,051,794 A | * | 4/2000 | Katou et al. ............. | 174/152 G |

\* cited by examiner

Primary Examiner—Burton S. Mullins
(74) Attorney, Agent, or Firm—Baker Botts L.L.P.

(57) ABSTRACT

A protective covering for protecting motor leads of a motor. The protective covering includes a first portion that is fixedly securable to a housing of a motor, and a covering portion connected to the first portion that, when the protective covering is secured to a motor housing, extends substantially outwardly from the motor to partially shield the motor leads from various elements present in the operating environment. The covering portion extends substantially above the motor leads, and also further extends downwardly substantially along an external sides of the motor leads so as to partially shield the motor leads. Portions of the protective covering may have a substantially U-shaped cross-section, wherein legs of the U-shaped cross-section extend to further shield the motor leads.

11 Claims, 3 Drawing Sheets

PROTECTIVE COVERING FOR MOTOR LEADS

BACKGROUND OF THE INVENTION

1. Field of the Invention

This invention relates to the operation of motors in general, and more particularly, to a protective covering used to protect motor leads from the surrounding operating environment and various elements present therein.

2. Description of Related Art

Electric motors have been used for an infinite number of applications and in an infinite number of different operating environments. Motors are frequently used in manufacturing or production facilities to perform designated tasks, while at the same time various other types of machinery are performing other tasks. Under such circumstances it is not uncommon for the motor to be exposed to harsh or corrosive elements, or even simply to liquid elements, during the normal course of operation. When a motor is exposed to potentially corrosive elements, or used in a wet environment, it becomes exceedingly important to protect the motor leads between the motor and the motor controller from exposure to these elements. If the motor leads are not protected, the liquid or corrosive element may permanently damage the motor leads, ultimately causing the controller to fail and/or permanently damage internal circuitry in the controller. Repair or replacement of these damaged parts is time consuming, and can be expensive.

In order to prevent the scenario described above as well as for other safety reasons, motor leads are typically surrounded by a protective covering, such as a rubber covering. Under many circumstances, however, the protected motor leads rub or chafe against other moving, vibrating or rotating parts. This may happen due to the leads not being positioned properly, the leads being moved by individuals working in and around the motor, or simply by repositioning of the cables as a result of vibrations or the like. In any event, it often occurs that the protective covering develops holes or cuts in it, allowing the leads themselves to become exposed to the elements in the operating environment. Many efforts have been made to prevent holes or cuts from developing in the protective covering, but these efforts do not address preventing exposure of the motor leads to corrosive or liquid elements should such holes or cuts later develop.

Accordingly, there is a need for an improved protective covering to aid in shielding motor leads from elements in the operating environment, and in particular to liquid or corrosive elements.

SUMMARY OF THE INVENTION

A motor assembly is provided including a motor encased in a motor housing, motor leads extending from the motor housing, and a protective covering secured to the motor housing and extending outwardly therefrom so as to partially shield the motor leads from elements in the operating environment. In one embodiment, the protective covering includes a first portion that is secured to the motor housing, a second portion connected to the first portion and extending outwardly therefrom substantially above the motor leads, and a third portion connected to the second portion and extending substantially downwardly therefrom substantially along an external side of the motor leads so as to further shield the motor leads.

In another embodiment, the second and third portions have a center portion and two leg portions extending therefrom so as to form a substantially U-shaped cross-section. According to yet another embodiment, the legs of the second portion extend substantially downwardly from the center portion to further shield the motor leads, and the legs of the third portion extend substantially inwardly from the center portion toward the motor housing to further shield the motor leads.

A protective covering for motor leads of a motor is also provided having a first portion having a first end for fixedly securing the protective covering to a housing of a motor, a second portion connected to the first portion for partially covering a top side of the motor leads, and a third portion connected to the second portion for partially covering an external side of the motor leads.

In one embodiment, the second portion has a substantially U-shaped cross-section for further shield the motor leads, and in yet another embodiment the third portion has a substantially U-shaped cross-section for further shielding the motor leads.

A protective covering is also provided having a first portion being fixedly securable to a housing of a motor, and a covering portion connected to the first portion. When the first portion is fixedly secured to the motor housing, the covering portion extends substantially outwardly from the motor and partially shields the motor leads. According to one embodiment, when the first portion is secured to the motor housing the covering portion extends substantially above the motor leads, and in yet another embodiment, when the first portion is secured to the motor housing the covering portion further extends substantially along an external side of the motor housing.

According to yet another embodiment, the covering portion has a substantially U-shaped cross-section, and in yet another embodiment when the first portion is fixedly secured to the motor housing, legs of the covering portion partially shield lateral sides of the motor leads.

In another embodiment, the first portion and covering portion are integrally formed, whereas in yet another embodiment, the first and covering portions are formed of separate parts that are fixedly secured together.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 5b is a sketch of a cross-sectional view of a protective covering taken along line A—A of FIG. 5a.

DESCRIPTION OF THE PREFERRED EMBODIMENTS

Preferred embodiments of the present invention are illustrated in the Figures, like numerals being used to refer to like and corresponding parts of the various drawings.

Figure 1:
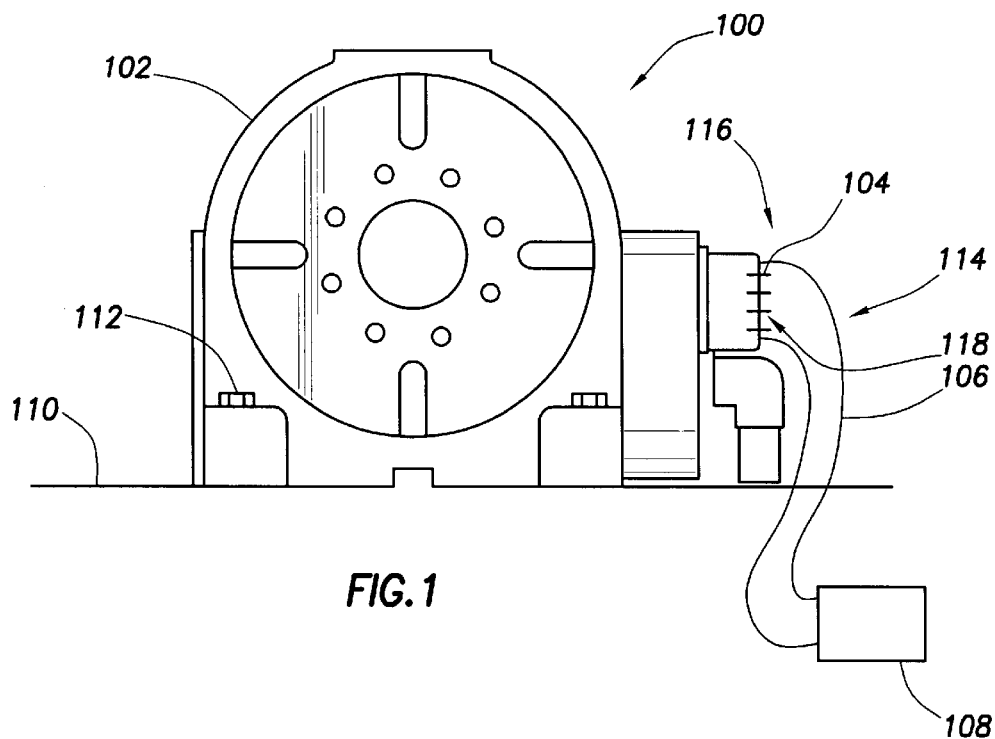
FIG. 1 is a sketch of a front view of a typical motor encased in a motor housing.

FIG. 1 illustrates a typical motor 100 encased in a motor housing 102 to protect the motor. Motor leads 104 project outwardly from the motor housing at one end. As is well known, these motor leads provide an electrical connection to working components of the motor, and provide a means by which the motor can be electrically controlled. Motor leads 104 may be electrically coupled via any suitable conductor, such as an electric cable 106 or the like, to a motor controller 108 that controls the operation of the motor 100. A motor often is secured to a base 10 by securing members 112, such as bolts, that securely couple the motor housing 102 to the base 110.

As indicated, the motor leads 104 are electrical conductors such as wires that extend through and external to the motor casing, and provide the means by which the motor can be electronically controlled. Because they extend external to the motor casing, the motor leads are potentially exposed to any elements present in the operating environment and, therefore, are vulnerable to damage if they come in contact with harsh or corrosive elements, or even simply any liquid. For these reasons motor leads are typically surrounded by some type of protective covering, but as described above, this often is not enough.

Figure 2:
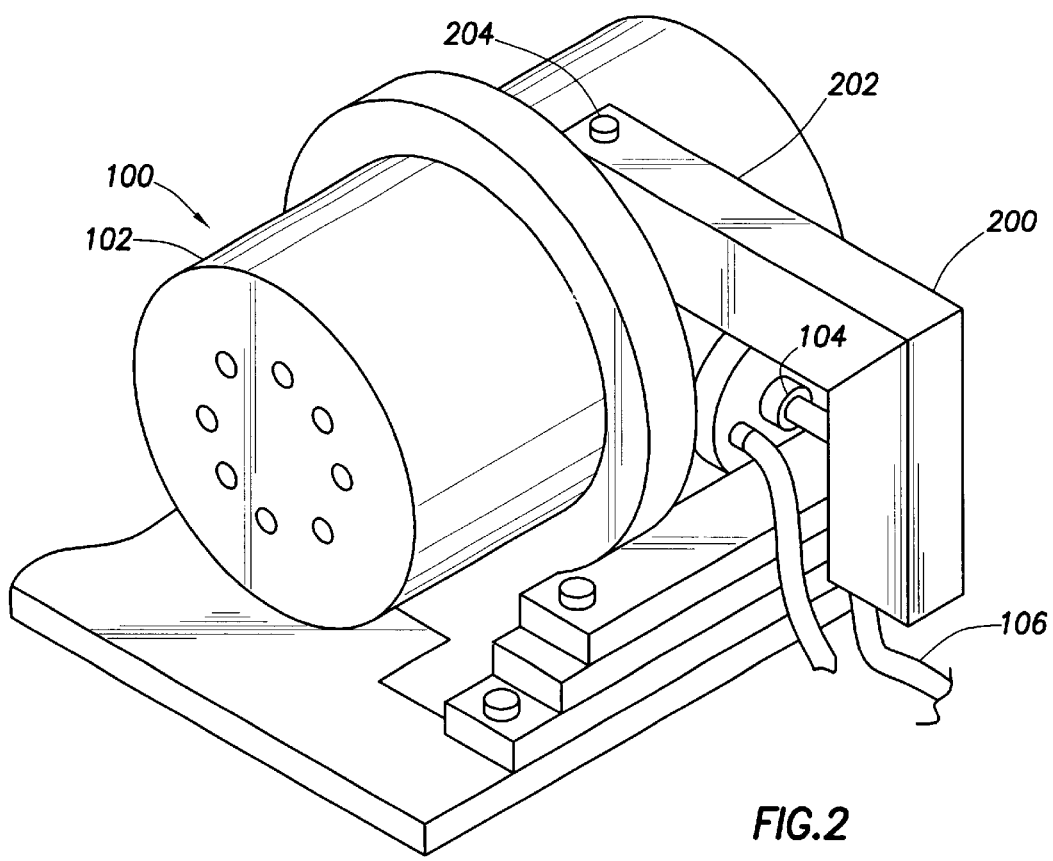
FIG. 2 is a sketch of a perspective view of a typical motor having a protective covering attached thereto.
Figure 3:
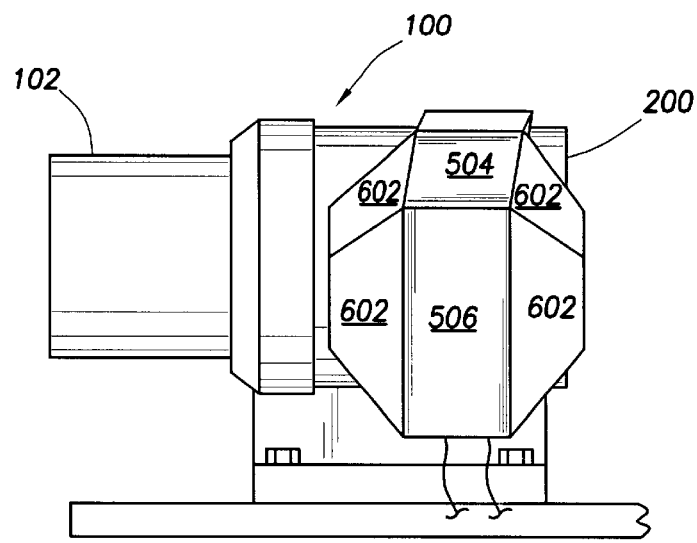
FIG. 3 is a sketch of a side view of a typical motor having a protective covering attached thereto.

FIGS. 2 and 3 illustrate a typical motor having a protective covering 200 attached thereto for providing an additional layer of protection for the motor leads against any elements, and particularly fluids, that may exist in the operating environment. The protective covering 200 has a first end 202 that is rigidly secured to the motor housing by any suitable method, such as by bolts 204 or the like. The protective covering extends outwardly from the motor housing so as to partially shield the motor leads from contact with elements in the operating environment by partially covering or surrounding the motor leads. In the illustrated embodiment, the covering extends outwardly over the motor leads so as to protect or shield the top side 116 of the motor leads from any debris or liquid that may fall down on the motor from above. In the embodiment shown, the protective covering not only projects outwardly from the motor casing above the motor leads, but also further projects downwardly to further shield or cover an external side 114 of the motor leads that is farthest away from the motor casing. This provides additional protection against debris or liquids coming in contact with the motor leads.

Figure 4:
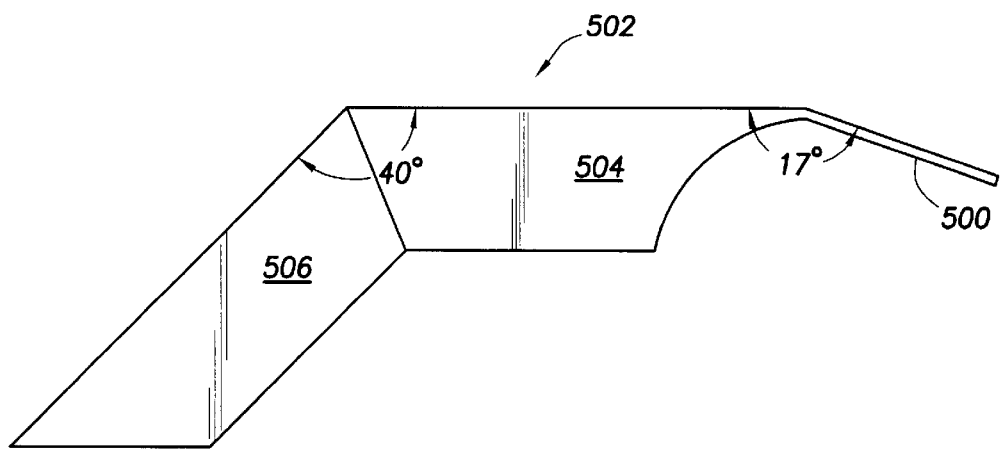
FIG. 4 is a sketch of a side view of a protective covering.

FIG. 4 is a side view illustrating one embodiment of the protective covering in greater detail. The protective covering includes a first portion 500 including the first end 202, a covering portion 502 that is connected to and extends from the first portion to partially shield the motor leads when the protective covering is secured to a motor housing. The covering portion 502 may include a second portion 504 and a third portion 506. The second portion is connected to the first portion and when the protective covering is secured to the motor housing as shown, extends outwardly from the motor housing over the top side 116 of the motor leads. The third portion is connected to the second portion and extends substantially downwardly from the second portion so that it is positioned along side of, but slightly spaced apart from, an external side of the motor leads, and further shields the motor leads.

Figure 5B:
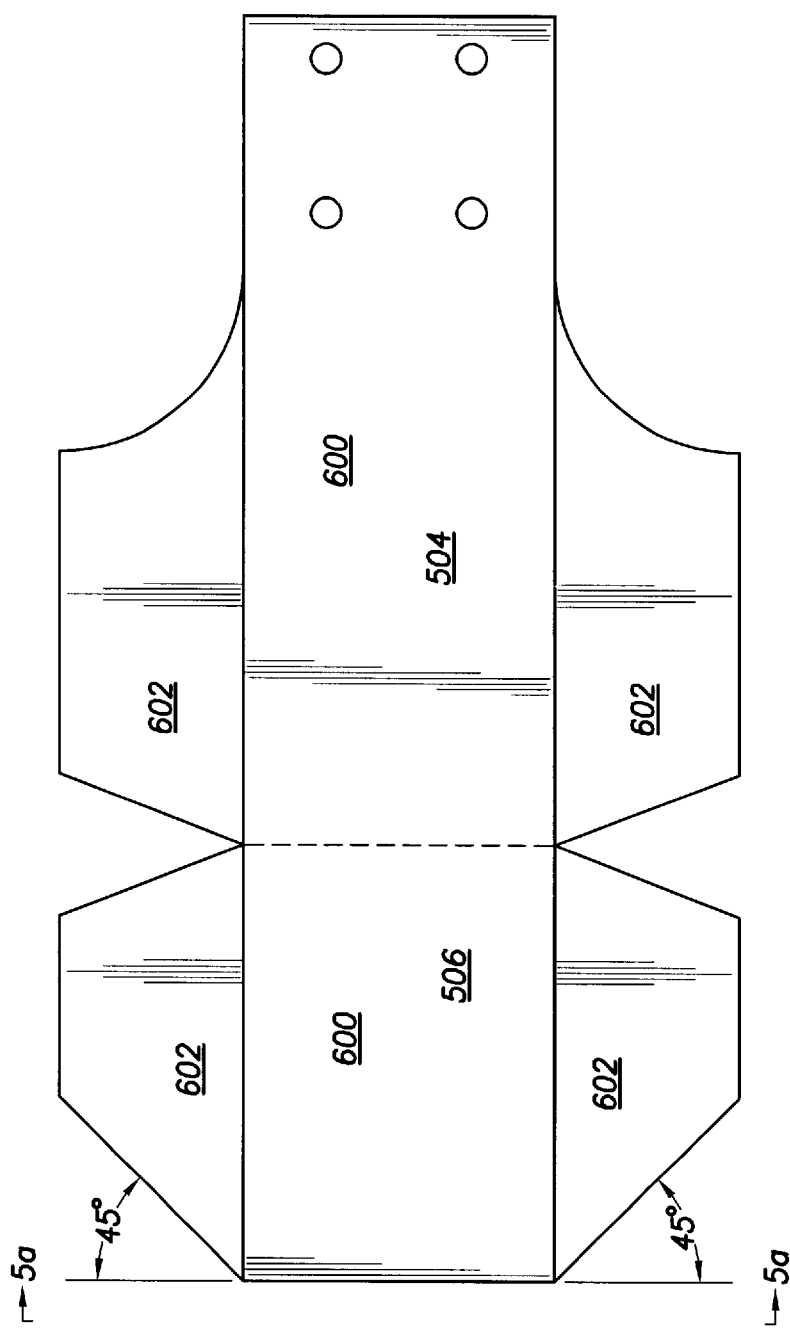
Figure 5A:
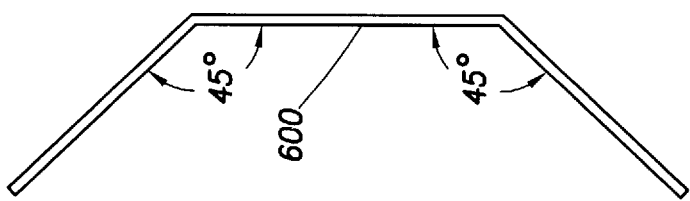
FIG. 5a is a sketch of a top view of a protective covering.

In one embodiment, portions of the protective covering include a substantially U-shaped cross section formed by a center portion 600 and two leg portions 602 extending therefrom, as illustrated by FIGS. 5a and 5b. When secured to a motor housing, the two leg portions 602 of the second portion 504 extend substantially downwardly from the center portion 600, and the two leg portions 602 of the third portion 506 extend substantially inwardly toward the motor housing from the center portion 600 as shown in FIGS. 2 and 3. The projection of the leg portions of the second and third portions further shields lateral sides 118 of the motor leads to provide even greater protection. FIG. 3 is a side view that illustrates how the leg portions of the first and second portions further shield and provide additional protection for the motor leads. Although one embodiment of the protective covering is illustrated by FIGS. 2 through 5, it will be understood that design deviations may be made without departing from the scope of the invention. The portions of the protective covering may be separate elements rigidly secured together, such as by welding or the like, or may be integral. Likewise, the portions of the protective covering may be fitted together at a predefined angle relative to one another, or may form a continuous arc.

Further, FIGS. 5a and 5b illustrate the contour of and dimensions for one embodiment that is particularly suited for use with a NSK Mega Indexer motor, model VT 150. It will be understood that these values are exemplary only, and that variations will be necessary to conform the protective covering to different types or sizes of motors.

Although the present invention has been described in detail, it should be understood that various changes, substitutions and alterations can be made hereto without departing from the spirit and scope of the invention as defined by the appended claims.

What is claimed is:

1. A protective covering for motor leads of a motor, comprising:
    a first portion being fixedly securable to a housing of said motor;
    a second portion having a substantially U-shaped cross-section, said second portion being connected to said first portion so that, when said first portion is fixedly secured to said housing, said second portion extends substantially above said motor leads; and
    a third portion having a substantially U-shaped cross-section, said third portion being connected to said second portion so that, when said first portion is fixedly secured to said housing, said third portion extends substantially along an external side of said motor leads.

2. The protective covering according to claim 1, wherein said second and third portions each include a center portion and two leg portions forming said substantially U-shaped cross-sections, said leg portions of said second portion extending substantially downwardly from said center portion, and said leg portions of said third portion extending substantially inwardly from said center portion towards said motor housing.

3. The protective covering according to claim 2, wherein said legs of said second portion partially shield lateral sides of said motor leads.

4. The protective covering according to claim 3, wherein said legs of said third portion partially shield lateral sides of said motor leads.

5. A protective covering for motor leads of a motor comprising:
    a first portion having a first end for fixedly securing said protective covering to a housing of said motor;
    a second portion connected to said first portion for partially shielding a top side of said motor leads, said second portion having a substantially U-shaped cross-section for further shielding said motor leads; and
    a third portion connected to said second portion for partially shielding an external side of said motor leads, said third portion having a substantially U-shaped cross-section for further shielding said motor leads.

6. A motor assembly comprising:

a motor encased in a motor housing;

motor leads extending from said motor housing; and a protective covering secured to said motor housing, and extending outwardly therefrom so as to partially shield said motor leads from elements in the operating environment, said protective covering comprising a first portion secured to said motor housing, a second portion conntected to said first portion and extending outwardly therefrom such that said second portion extends substantially above said motor leads, and a third portion connected to said second portion and extending substantially downwardly therefrom substantially along an external side of said motor leads so as to further shield said motor leads, said second and third portions of said protective covering each having a center portion and two leg portions extending therefrom so as to form a substantially U-shaped cross section.

7. The motor assembly according to claim 6, wherein said leg portions of said second portion of said protective covering extend substantially downwardly from said center portion.

8. The motor assembly according to claim 7, wherein said leg portions of said second portion further shield said motor leads.

9. The motor assembly according to claim 8, wherein said leg portions of said third portion of said protective covering extend substantially inwardly from said center portion toward said motor housing.

10. The motor assembly according to claim 9, wherein said leg portions of said third portion of said protective covering further shield said motor leads.

11. The motor assembly according to claim 10, further comprising a controller for controlling said motor, said controller being electrically coupled to said motor leads.

* * * * *